United States Patent
Skor et al.

(10) Patent No.: US 7,581,676 B2
(45) Date of Patent: Sep. 1, 2009

(54) METHOD AND APPARATUS FOR PURCHASING AND DISPENSING PRODUCTS

(76) Inventors: Douglas Brian Skor, 248 W. Lincoln Ave., Barrington, IL (US) 60010; Eugene Brooks Lilly, 4209 W. 104th Ter., Overland Park, KS (US) 66207

( * ) Notice: Subject to any disclaimer, the term of this patent is extended or adjusted under 35 U.S.C. 154(b) by 368 days.

(21) Appl. No.: 11/329,608

(22) Filed: Jan. 11, 2006

(65) Prior Publication Data

US 2006/0157560 A1  Jul. 20, 2006

Related U.S. Application Data

(60) Provisional application No. 60/644,401, filed on Jan. 14, 2005.

(51) Int. Cl.
*G06K 15/00* (2006.01)
(52) U.S. Cl. .................. 235/383; 235/381; 235/380; 705/16
(58) Field of Classification Search ............. 235/383, 235/381, 380; 705/16, 23, 26
See application file for complete search history.

(56) References Cited

U.S. PATENT DOCUMENTS

| | | | | |
|---|---|---|---|---|
| 5,186,281 A * | 2/1993 | Jenkins | ................ | 186/55 |
| 5,595,264 A * | 1/1997 | Trotta, Jr. | ................ | 186/56 |
| 5,918,211 A * | 6/1999 | Sloane | ................ | 705/16 |
| 5,933,814 A * | 8/1999 | Rosenberg | ................ | 705/26 |
| 6,351,688 B1 | 2/2002 | Nichols et al. | | |
| 6,434,530 B1 * | 8/2002 | Sloane et al. | ................ | 705/1 |
| 6,688,435 B1 * | 2/2004 | Will et al. | ................ | 186/35 |
| 6,792,334 B2 * | 9/2004 | Metcalf et al. | ................ | 700/237 |
| 6,854,642 B2 * | 2/2005 | Metcalf et al. | ................ | 235/375 |
| 2002/0087413 A1 * | 7/2002 | Mahaffy et al. | ................ | 705/16 |
| 2002/0095343 A1 | 7/2002 | Barton et al. | | |
| 2003/0222092 A1 | 12/2003 | Sherrod | | |
| 2003/0222135 A1 | 12/2003 | Stoutenburg et al. | | |

(Continued)

OTHER PUBLICATIONS www.vensafe.com web pages, Oct. 20, 2004, 15 pages.

*Primary Examiner*—Ahshik Kim
(74) *Attorney, Agent, or Firm*—McAndrews, Held & Malloy, Ltd.

(57) ABSTRACT

A system for purchasing a product that does not need to be physically present at a point-of-sale includes a point-of-sale device, a product-selection device, a data-analyzing device, an inventory-managing device, and a dispensing machine. The point-of-sale device includes apparatus for scanning or otherwise inputting a first product that is physically present at the point-of-sale. The product-selection device includes apparatus for selecting a second product that does not need to be physically present at the point-of-sale by a characteristic other than by a standardized product identification number corresponding to the second product, controller and memory apparatus for retrieving a standardized product identification number corresponding to the second product, and communication apparatus for sending the standardized product identification number of the selected second product to the point-of-sale device. The data-analyzing device receives completed purchase transaction data from the point-of-sale device and identifies the selected second product from that data. The data-analyzing device thereafter sends instructions to the dispensing machine for dispensing the second product. The inventory-managing device communicates with the product-selection device, data-analyzing device, and dispensing machine to inform customers of product availability, reserve products for customers, and maintain inventory of products.

6 Claims, 6 Drawing Sheets

U.S. PATENT DOCUMENTS

| | | |
|---|---|---|
| 2004/0044438 A1 | 3/2004 | Lorraine et al. |
| 2004/0083026 A1 | 4/2004 | Barton |
| 2004/0089669 A1 | 5/2004 | Garratt |
| 2004/0099734 A1 | 5/2004 | Barton et al. |
| 2004/0172339 A1 | 9/2004 | Snelgrove et al. |
| 2004/0195315 A1 | 10/2004 | Workens |

* cited by examiner

METHOD AND APPARATUS FOR PURCHASING AND DISPENSING PRODUCTS

RELATED APPLICATIONS

This present application claims priority from provisional application 60/644,401, filed Jan. 14, 2005. Additionally, the present application incorporates by reference provisional application 60/644,401, filed Jan. 14, 2005.

BACKGROUND OF THE INVENTION

Many vendors such as large grocery chains, convenience stores, and retailers have problems with shrinkage (theft) of small, high priced items such as cigarettes, batteries, stop-smoking aids, replacement razor heads, home pregnancy test kits, and perfume. Several vendors have taken these items off the retail shelves and count on labor to deliver them in the check-out area near a point-of-sale device ("POS") such as a cash register. Moving small, high priced items from the shelves to, for example, behind a counter or behind locked windows only guards against customer theft; it does not guard against employee theft. Thus, other vendors have chosen to remove small, high priced items from their stock entirely.

U.S. Patent Application Publication No. 2004/0099734 (published May 27, 2004 and identifying Barton et al. as inventors) (the "Barton application") discloses an apparatus and method for a customer to purchase physically absent products (products that are not collectable by customers in the store or accessible by employees such as cashiers) at the same time that he purchases products that he has collected and brought to the POS. Embodiments include both cashier-operated and self-scanning POS devices. A customer brings his collected products to either style POS, and the cashier or customer scan or otherwise input product identification information to the POS. At that time, the customer or cashier can also select products in addition to those that the customer has collected from the store and brought to the POS, by making selections on a device such as a touch-screen. The cost of the selected items is added to the entire bill. The selected items are dispensed at the POS. Thus, the customer pays once for all products, the products he has collected and brought to the POS and the products he has selected from a touch-screen at the POS and that are subsequently dispensed.

The Barton application may disclose an apparatus that allows for the purchase of small, high priced items without giving customers and certain employees access to them until after they are purchased. The apparatus of the Barton application, however, is large, complicated, and expensive, requiring significant custom modification of a POS and taking up valuable space in the immediate area of the POS.

Another effort to combat shrinkage has been taken up by the Norwegian-based company Vensafe. The Vensafe system provides vending of products from a vending machine that may be remote from a POS. Product displays within the store and/or at the point of sale include cards having a picture of the products available in the vending machine and a corresponding bar code. After the customer select cards for products he wants to purchase, the cards are presented first to a POS for purchase and then to a second device, a peripheral card reader, for validation. The customer then takes the validated cards to the vending machine and inserts them into a reader. The vending machine dispenses products corresponding to the validated cards. The cards remain in a receptacle in the vending machine for future reuse.

The Vensafe system may combat shrinkage. Vensafe's system, however, is large, expensive, and complicated. In the Vensafe system, a store displays cards with bar codes on them corresponding to the products they represent. At the POS, the cashier or customer must present multiple cards representing the multiple products the customer wishes to buy to a scanner for purchasing and to a second peripheral device for validation. After the transaction is complete, the customer must present the validated cards, a third time, to the vending machine to collect the products. The cards are accumulated in a bin inside the vending machine and must then be manually sorted for reuse and redisplayed in the store.

Thus, a need exists for the automated dispensing of products that are high in value or susceptible to theft.

BRIEF SUMMARY OF THE INVENTION

Certain embodiments of the present invention provide a system for purchasing products at, for example, a grocery store or convenience store. The system includes a cashier-operated or customer-operated point-of-sale device ("POS") readily available in the industry. The system also includes a dispensing machine for dispensing products that are not physically accessible until purchased, an inventory-managing device for managing the inventory of the products housed in the dispensing machine, and two add-on devices, a product-selection device and a data-analyzing device, which can communicate with the existing POS with little or no modification to the POS.

The dispensing machine is preferably located remote from the POS in a grocery store application and proximate to the POS in a convenience store application. The dispensing machine houses products available for sale at the POS.

The location of the inventory-managing device is not significant so long as it can communicate with the other system components (the product-selection device, data-analyzing device and dispensing machine).

The product-selection device may be located proximate or distal to the POS and linked with the POS either by wire or wirelessly. The product-selection device allows customers to select products for purchase that are housed in the dispensing machine. A customer chooses a product based on the product's name, description, picture, etc. being indicated by the product-selection device. When a product is selected, the product-selection device retrieves, from memory, a standardized product identification number corresponding to the product, and sends the number to the POS. A standardized product identification number would be, for example, a UPC in the U.S. or an EAN in Europe. The product-selection device sends the standardized product identification number to the POS in the same manner that a scanner would send a standardized product identification number obtained from scanning a barcode on a product label. Thus, the POS, which already is configured to receive and understand data from a barcode scanner, does not need to be modified to receive and understand data from the product-selection device.

The product-selection device is linked (either by wire or wirelessly) with the inventory-managing device so that the product-selection device knows which products are available in the dispensing machine and in what quantity and so that the product-selection device can temporarily reserve selected products.

The data-analyzing device is preferably located proximate to the POS and linked with the POS either by wire or wirelessly. The data-analyzing device receives data from the POS that is bound for either the receipt printer or poll display. The data-analyzing device is able to read the data and identify purchased products that are housed in the dispensing machine by their standardized product identification numbers.

The data-analyzing device is linked (either by wire or wirelessly) with the inventory-managing device so that the data-analyzing device can transmit data to the inventory-managing device to permanently reserve the purchased products. The data-analyzing device is also linked (either by wire or wirelessly) with the dispensing machine (either directly or via the inventory-managing device) so that the data-analyzing device can transmit instructions to the dispensing machine regarding products to be dispensed. For example, the data-analyzing device may transmit a transaction number to the dispensing machine that matches the transaction number bar-coded on the customer's receipt. The customer can then present the receipt to a scanner on the dispensing machine to have the products dispensed.

DETAILED DESCRIPTION OF THE INVENTION

Figure 1:
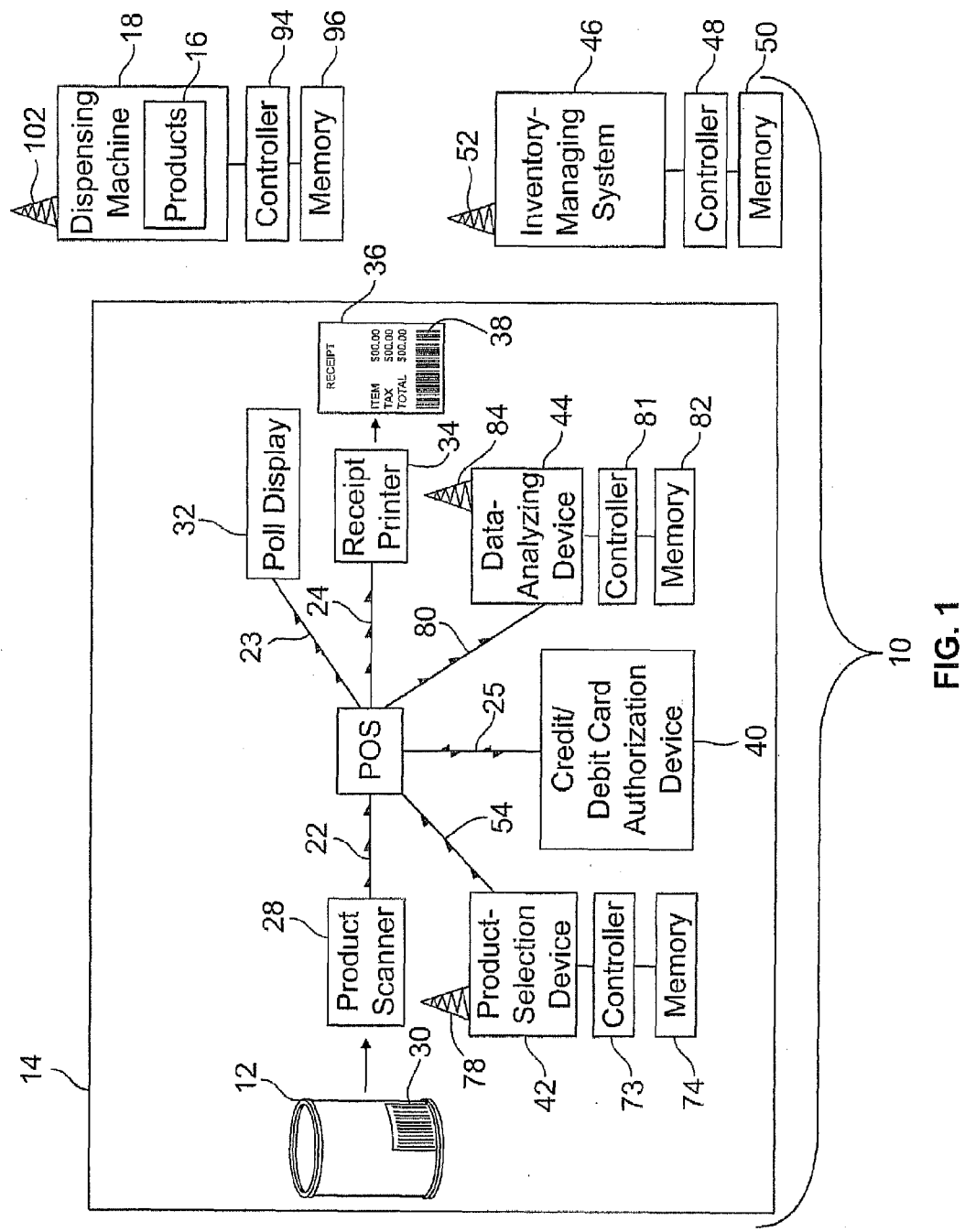
FIG. 1 illustrates a flowchart of a system for purchasing products according to an embodiment of the present invention.

FIG. 1 illustrates a flowchart of a system 10 for purchasing products at, for example, a grocery store or convenience store. The system 10 facilitates the purchasing of products 12 that are collected from throughout the store and brought to the check-out area 14. The system 10 also facilitates selecting, purchasing, and dispensing products 16 (shown in FIG. 4) housed in a dispensing machine 18. The dispensing machine 18 may be located inside or outside the check-out area 14. In a grocery store application, the dispensing machine 18 is preferably located outside the check-out area 14 as illustrated in FIG. 1. In a convenience store application, the dispensing machine 18 is preferably located inside the check-out area 14 (not shown).

The system 10 includes a cashier-operated point-of-sale device ("POS") 20 that is typically found in grocery and convenience stores and made available by IBM, NCR Corp., and others. The POS 20 includes a cash drawer and keyboard (not shown). Data links 22-25 connect the POS 20 with a product-scanner 28 for scanning barcodes 30 labeled on products 12, a poll display 32 for displaying product and price information, a receipt printer 34 for printing receipts 36 of completed transactions with a barcode 38 encoding a transaction number, and a credit/debit card authorization device 40 for authorizing charges, respectively.

The system 10 also includes up to three additional devices: a product-selection device 42, a data-analyzing device 44, and an inventory-managing device 46. Optionally, the product-selection device 42, the data-analyzing device 44, and the inventory-managing device 46 may be combined with one another and/or with the dispensing machine 18. In one embodiment, however, the product-selection device 42, the data-analyzing device 44, the inventory-managing device 46, and the dispensing machine 18 constitute separate devices as shown in FIG. 1.

The Inventory-Managing Device

The inventory-managing device 46 includes a controller 48 and a memory 50 for managing and recording inventory data. (References to "data" may include either the singular or plural.) The inventory-managing device 46 also includes a transmitter/receiver 52 for communicating with the product-selection device 42, the data-analyzing device 44, and the dispensing machine 18 as described below.

The Product-Selection Device

Figure 2:
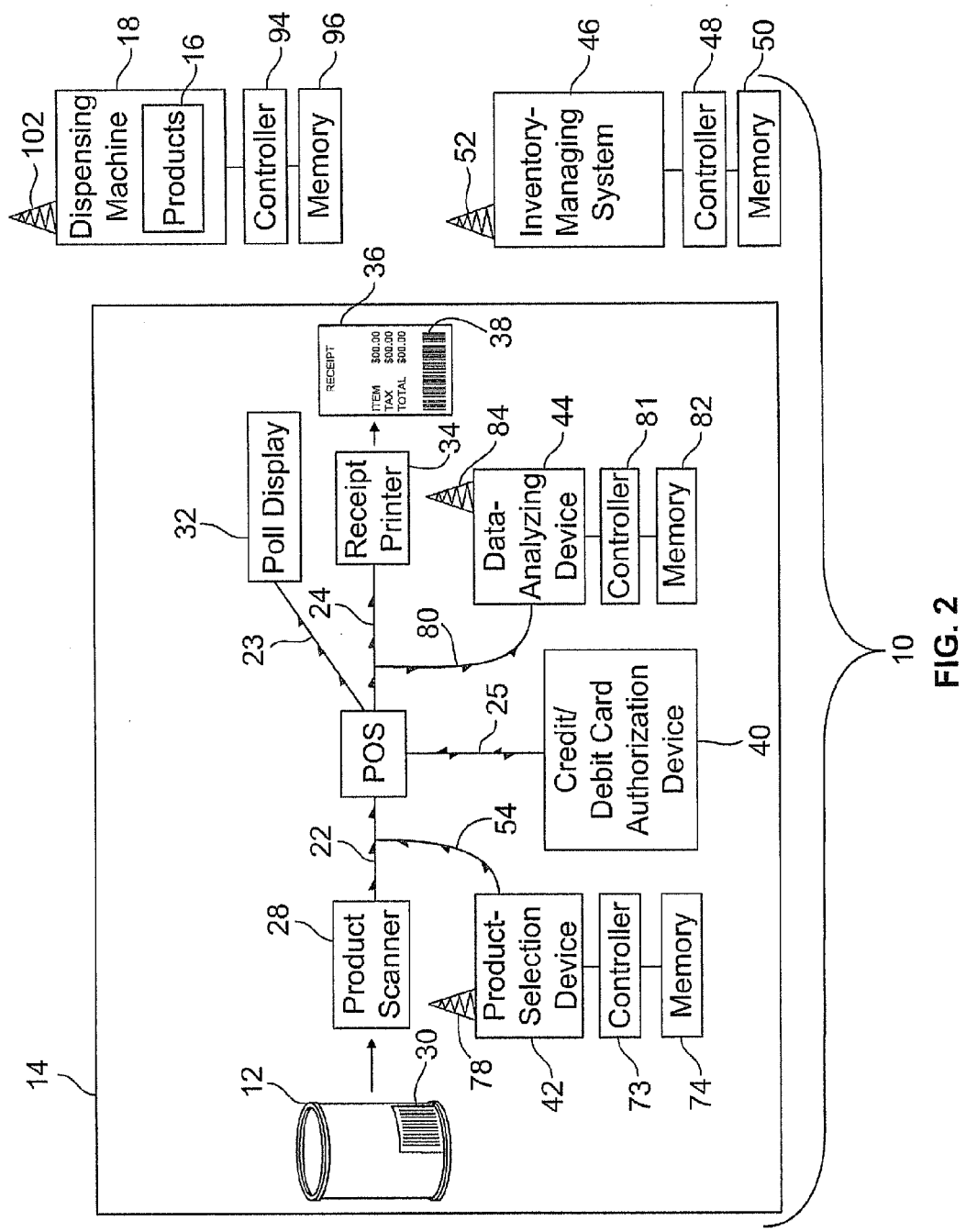
FIG. 2 illustrates a flowchart of a system for purchasing products according to an embodiment of the present invention.

The product-selection device 42 is linked with the POS 20. Specifically, the POS 20 includes an input data link 54 from the product-selection device 42. The input data link 54 may run directly into the POS 20, or, alternatively, may feed into the data link 22 already running from the product-scanner 28 into the POS 20 as shown in FIG. 2. An additional alternative would be to feed data from the product-scanner 28 into the product-selection device 42 via a modified data link 22 (shown in FIG. 6). The product-selection device 42 would then relay the product-scanner 28-data to the POS 20 via data link 54.

Figure 3:
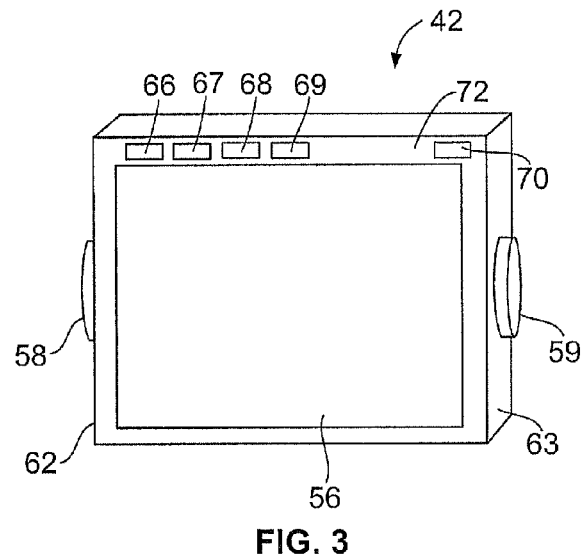
FIG. 3 illustrates a product-selection device according to an embodiment of the present invention.

The product-selection device 42 permits a customer or store operator to select products 16 for purchase that are housed in the dispensing machine 18 and, thus, unavailable for scanning. FIG. 3 illustrates the product-selection device 42 in greater detail. The product-selection device 42 includes a centrally-located screen 56 as well as knobs 58-59 on opposing sides 62-63 of the product-selection device 42. The product-selection device also includes buttons 66-69 and a barcode scanner 70 on a top edge 72 of the product-selection device 42. Rotating knob 58 changes categories on a main menu. Rotating knob 59 scrolls through other minor menus. Depressing button 66 adds one of whatever type of product 16 is displayed on the screen 56 to an order. Depressing button 67 clears one of whatever type of product 16 is displayed on the screen 56 from the order. Depressing button 68 clears all of whatever type of product 16 is displayed on the screen 56 from the order. Depressing button 69 clears all products 16 from the entire order.

Alternatively, the product selection device 42 could employ a keypad or touch-screen (not shown) instead of, or in addition to, the knobs 58-59 and buttons 66-69. In such an alternative embodiment, the keypad or touch-screen could be configured to permit a customer to select a multitude of units of a particular product 16 all at once. In other words, the customer could enter the number "12" to get twelve packs of replacement razor heads instead of having to hit the button 66 twelve times when the pack of replacement razor heads is displayed on the screen 56.

The product-selection device 42 has a controller 73 for operation and a memory 74 (shown in FIG. 1) that stores a standardized product identification number corresponding to each of the products 16 available for selection on the product-selection device 42 and housed in the dispensing machine 18. A standardized product identification number would be, for example, a UPC in the United States or an EAN in Europe, and is typically encoded in a barcode on product packaging. (Standardized product identification numbers are also encoded in the barcodes 30 labeled on the products 12 that are collected from throughout the store and brought to the check-out area 14.)

The product-selection device 42 retrieves the standardized product identification number corresponding to a selected product 16 from the memory 74 and transmits the number to the POS 20. The product-selection device 42 transmits a standardized product identification number to the POS 20 in the same manner and form as the product-scanner 22 transmits a standardized product identification number to the POS 20. In other words, the product-selection device 42 speaks the same language that the product-scanner 22 speaks.

The memory 74 is also configured to store customer-specific information such as customer identification numbers, purchase history, and customer preferences. Thus, a customer can identify himself to the product-selection device 42 by presenting a customer identification number bar-coded on a key chain tag or customer card to the scanner 70 on the product-selection device 42. A repeat customer, upon identifying himself to the product-selection device 42, could retrieve his previous order from the last time he was at the store. He could then modify the selections he made in his previous order using the knobs 51-52 and buttons 56-59, as needed, before completing his transaction.

The product-selection device 42 includes a transmitter/receiver 78 that allows the product-selection device 42 to wirelessly communicate with the inventory-managing device 46. The transmitter/receiver 78 transmits data to the inventory-managing device 46 to temporarily reserve products 16 selected by a customer as those products 16 are selected. When a unit of product 16 is reserved, that particular unit immediately becomes unavailable to other customers.

The transmitter/receiver 78 receives inventory data from the inventory-managing device 46 so that the product-selection device 42 knows what products 16 are available and in what quantity. The product-selection device 42 does not display products 16 that are out of stock or otherwise unavailable without designating those products 16 as out of stock or otherwise unavailable. For example, a product 16 that is out of stock, could be shown in gray to indicate that it is out of stock while simultaneously indicating that the product 16 is usually carried by the store. Certain embodiments of the present invention may include the product-selection device 42 capable of suggesting alternative products to the customer that are similar to products that are out of stock.

When a unit of product 16 is initially selected by the customer on the product-selection device 42, the unit is temporarily reserved for the customer. If the unit is not purchased within a specified time, however, the unit will automatically revert back to in-stock status and become available to other customers for purchase. The time period for temporarily reserving the unit of product 16 can be adjusted shorter or longer depending on how much time lag a store manager wants to permit between selecting products 16 and purchasing products 16.

The Data-Analyzing Device

The data-analyzing device 44 is linked with the POS 20. Specifically, the POS 20 includes an output data link 80 to the data-analyzing device 44. The output data link 80 may run directly from the POS 20 as shown in FIG. 1, or, alternatively, may feed off the data link 24 already running from the POS 20 to the receipt printer 34 as shown in FIG. 2. An additional alternative would be to feed data from the POS 20 into the data-analyzing device 44 via a modified data link 46 (shown in FIG. 6). The data-analyzing device 44 would then relay the POS 20-data to the receipt printer 34 via data link 24.

The data-analyzing device 44 is configured to receive and understand data that is output from the POS 20 to the receipt printer 34. The data-analyzing device 44 includes a controller 81 for operation and a memory 82 for storing standardized product identification numbers pertaining to products 16 that are stored in the dispensing machine 18. Using that memory 82, the data-analyzing device 44 reviews the data received from the POS 20 and identifies standardized product identification numbers that pertain to products 16 that are stored in the dispensing machine 18. The data-analyzing device 44 disregards the portion of the data pertaining to the products 12 that have already been collected by the customer. It is noted, however, with reference to FIG. 6, that while the data-analyzing device 44 may disregard data pertaining to the products 12 that have already been collected by the customer, it nevertheless relays that data, unaltered, to the receipt printer 34.

The data-analyzing device 44 includes a transmitter/receiver 84 that allows the data-analyzing device 44 to transmit data to the inventory-managing device 46 to permanently reserve products 16 that the data-analyzing device 44 has identified as purchased. The transmitter/receiver 84 also allows the data-analyzing device 44 to transmit a purchase transaction number to the inventory-managing device 46 for matching each customer's transaction with his order of products 16. In a preferred embodiment, the transaction number is generated by the POS 20 and thereafter relayed, first via the data-analyzing device 44 and second via the inventory-managing device 46, to the dispensing machine 18. Certain embodiments of the present invention may optionally employ transaction numbers that are generated by the data-analyzing device 44 and sent both to the receipt printer 34 and, via the inventory-managing device 46, to the dispensing machine 18.

The transmitter/receiver 84 also allows the data-analyzing device 44 to receive instructions from the inventory-managing device 46 regarding which standardized product numbers should be of significance to the data-analyzing device 44. In other words, the transmitter/receiver 84 allows the data-analyzing device 44 to be programmed remotely from the inventory-managing device 46.

The Dispensing Machine

Figure 4:
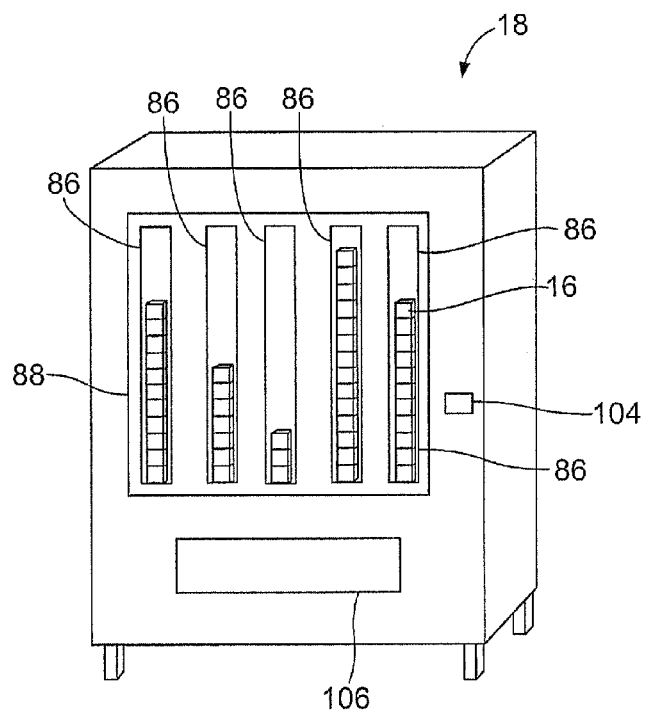
FIG. 4 illustrates a dispensing machine according to an embodiment of the present invention.
Figure 5:
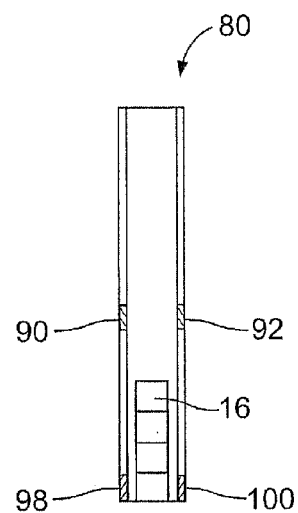
FIG. 5 illustrates a component of a dispensing machine according to an embodiment of the present invention.

FIG. 4 illustrates the dispensing machine 18. The dispensing machine 18 houses the products 16 in columns 86. Preferably the columns 86 are visible though a glass pane 88. FIG. 5 illustrates a column 86 in greater detail. Each column 86 includes a primary infrared emitter 90 and sensor 92 positioned at an optimal intermediate height in the column 86. The optimal height may be a function of how the product 16 is packaged. For example, if the product 16 arrives at stores in packages of twelve, the primary emitter 90 and sensor 92 may be optimally positioned at a height of twelve units of product 16. Alternatively, the primary emitter 90 and sensor 92 may be positioned at a multiple of twelve. Optionally, the primary emitter 90 and sensor 92 may be positioned at a uniform height such as the midpoint for all of the columns 86 despite that each column 86 may house a different product 16 that is packaged differently.

The primary sensor 92 detects an infrared signal emitted by the primary emitter 90 whenever a product 16 is not positioned between the primary emitter 90 and sensor 92. Thus, if the primary sensor 92 does not receive a signal, the column 86 contains at least as many units of product 16 as corresponding to where the primary sensor 92 is positioned. In FIG. 5, the primary sensor 92 receives a signal from the primary emitter 90, thereby indicating that column 86 has less products 16 than that corresponding to where the primary sensor 92 is positioned.

The dispensing machine 18 includes a controller 94 and memory 96 (shown in FIG. 1) that can keep track of the number and type of products 16 dispensed. Thus, as long as a column 86 is always initially stocked at least up to the primary sensor 92, the controller 94 and memory 96 will know the exact number of a product 16 remaining whenever the column 86 is less than the minimum stocking amount. In other words, the controller 94 and memory 96 will always either (1) know that the column 86 contains at least the minimum quantity of the product 16 or (2) know that the column has less than the minimum amount and know that specific lesser amount.

The column 86 may also include a secondary infrared emitter 98 and sensor 100 positioned at the bottom of the column 86. In such an embodiment, the secondary sensor detects an infrared signal emitted by the secondary emitter 98 whenever a product 16 is not positioned between the secondary emitter 98 and sensor 100. Thus, if the secondary sensor 100 does not detect a signal, the column 86 has at least one unit of the product 16. If the secondary sensor 100 does detect a signal, the column 86 is out of products 16. Although the controller 94 and memory 96 can keep track of the quantity of products 16 without the use of the secondary emitter 98 and sensor 100, the secondary emitter 98 and sensor 100 may contribute to inventory accuracy during malfunction of certain other aspects of the invention.

For increased flexibility, the emitters 90 and 98 and sensors 92 and 100 may be adjustably positioned. For increased inventory detail, the columns 86 may be equipped with additional infrared emitters and sensors.

The dispensing machine 18 includes a transmitter/receiver 102 (shown in FIG. 1) for communicating with the inventory-managing device 46. Additionally, the dispensing machine 18 includes a scanner 104 (shown in FIG. 3) for scanning barcodes 38 on the receipts 36 to identify transaction numbers.

After completing payment for all purchased products 12 and 16, the customer receives the receipt 36 with the barcode 38 encoding the same transaction number that has already been relayed by the data-analyzing device 44, via the inventory-managing device 46, to the dispensing machine 18. When the customer presents barcode 38 on the receipt 36 to the scanner 104 on the dispensing machine 18, the dispensing machine 18 will dispense the products 16 that are associated with the transaction number encoded in the barcode 38 on the receipt 36. The products 16 are dispensed into a trough 106 from which the customer can grab the products 16. Alternatively, the dispensing 18 machine can be configured to dispense products 16 by dropping the products 16 directly into the customer's shopping bag (not shown).

Figure 6:
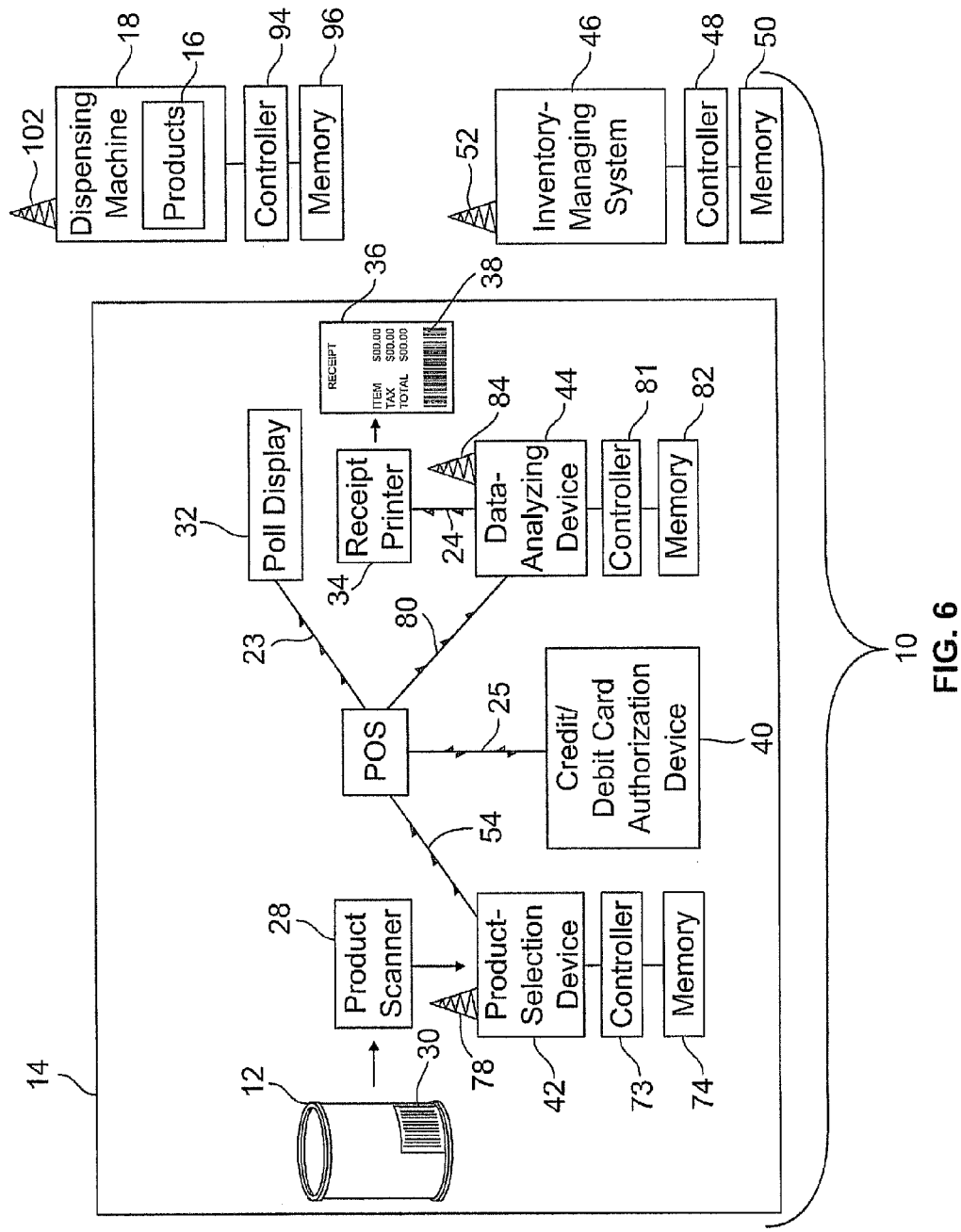
FIG. 6 illustrates a flowchart of a system for purchasing products according to an embodiment of the present invention.

The transaction number may or may not be random or encrypted, depending on the POS 20 that is employed. If the POS 20 does not generate random or otherwise encrypted transaction numbers, the data-analyzing device 44 optionally can be configured to generate a random or encrypted number and communicate that number to the receipt printer 34 via the modified data link 24 as shown in FIG. 6. In such an embodiment, the data-analyzing device 44 intercepts data intended for the receipt printer 34 from the POS 20 via the output data link 80. The data-analyzing device 44 relays the intercepted data along with the data-analyzing device 44-generated transaction number to the receipt printer 42.

The system 10 is designed so that an existing POS 20 can easily be coupled to the product-selection device 42 and data-analyzing device 44 without having to reconfigure or reprogram the POS 20, the product-scanner 28, poll display 32, receipt printer 34, or credit/debit card authorization device 40. If the POS 20 does not include an additional input port for the input data link 54 of the product-selection device 42, then the input data link 54 can tap into the existing data link 22 running from the product-scanner 28 as shown in FIG. 2. Similarly, if the POS 20 does not include an additional output port for the output data link 80 of the data-analyzing device 44, the output data link 80 can optionally tap into the existing data link 24 running to the receipt printer 34 as shown in FIG. 2.

Little if any adjustments are needed to the existing POS 20 or its component devices (i.e., the product-scanner 28, poll display 32, receipt printer 34, and credit/debit card authorization device 40). The product-selection device 42 speaks the language of standardized product identification numbers that the POS 20 is already programmed to understand. Likewise, the data-analyzing device 44 is configured to understand the language that the POS 20 is already programmed to speak.

It will be noted that, in a preferred embodiment of the present invention, the dispensing machine 18 does not receive payment for any products 16 it dispenses. In fact, the dispensing machine 18 does not even need to know the price of the products 16 it dispenses. In a preferred embodiment of the present invention, only the POS 20 executes the sale. The dispensing machine 18, product-selection device 42, and data-analyzing device 44 need not participate in the actual sale of products.

Remote Selection of Products

The product-selection device 42 has heretofore been described as an interactive terminal that is located in the check-out area 14 and which provides for the selection of products 16 in the check-out area 14. Alternative embodiments of the present invention may provide for at least a preliminary selection of products 16 outside of the check-out area 14. It will be noted that selection of products 16 outside of the check-out area 14 may help avoid the formation of customer bottlenecks at the check-out area 14.

Figure 7:
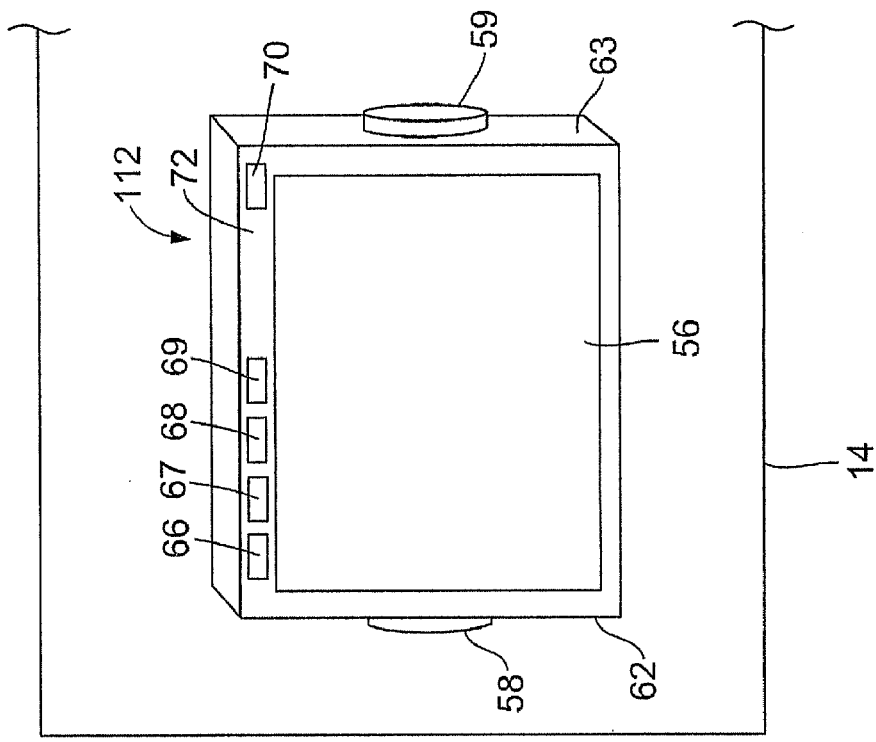
FIG. 7 illustrates a product-selection device according to an embodiment of the present invention.
Figure 7:
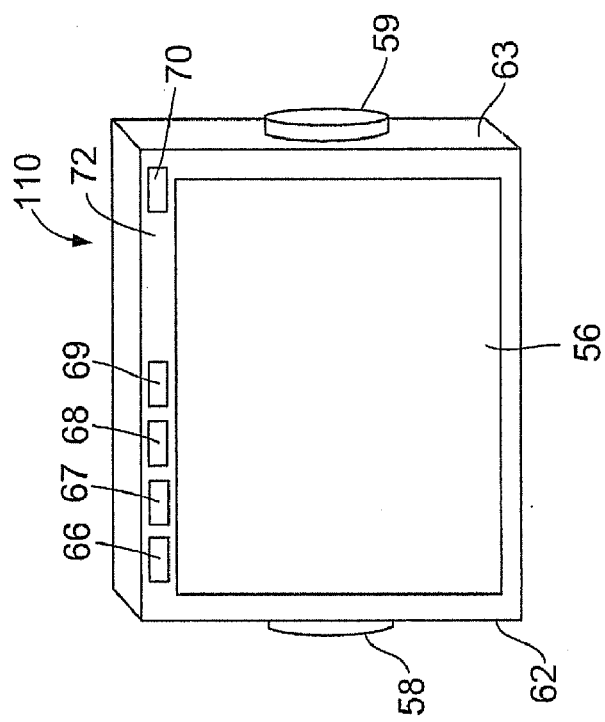

FIG. 7 illustrates an alternative product-selection device 108 that comprises a first unit 110 and a second unit 112. The first unit 110 is located outside the check-out area 14 and is configured to permit selection of products 16. The second unit is located inside the check-out are 14 and is configured to permit modification of an order of selected products 16. Both the first and second units 110 and 112 operate in the same manner and include most of the same components (i.e., screen 56, knobs 58-59, buttons 66-69, scanner 70, controller 73, memory 74, transmitter/receiver 78) as the product-selection device 42 illustrated in FIGS. 1-3. It is noted, however, that only the second unit 112 needs the output data link 80.

A customer selects products 16 using the first unit 110 before arriving at the check-out area 14. After the selections are made, instructions to temporarily reserve the selected products 16 are sent to the inventory-managing device 46. Additionally, transaction data (regarding the selections made) is attached to a customer or transaction number and sent to the second unit 112 of the product-selection device 108, either directly or via the inventory-managing device 46. At the check-out area 14, the customer can retrieve his pending order on the second unit 112 and modify the order as needed. The second unit 112 then sends the applicable corresponding standardized product identification numbers to the POS 20 and sends instructions to temporarily reserve the selected products 16 (as modified) to the inventory-managing device 46.

The customer may retrieve his order at the second unit 112 by identifying himself through a customer number or transaction number. If a customer number is employed for retrieval, the customer identifies himself at both the first and second units 110 and 112 by presenting a bar-coded key chain tag or customer card to the scanners 70 of each of the first and second units 110 and 112. If a transaction number is employed for retrieval, the first unit 110 is configured to generate and print out a bar-coded transaction number, which the customer can take and present to the scanner 70 on the second unit 112.

Alternatively, the first unit 110 may be a stand alone device that does not include the transmitter/receiver 78. After a customer makes his selections, the first unit 110 prints out bar-coded transaction data corresponding to those selections. The customer presents the barcode(s) to the scanner 70 on the second unit 112, which is located in the check-out area 14. The second unit 12 reads the transaction data, retrieves the corresponding standardized product identification numbers, sends the corresponding standardized product identification numbers to the POS 20, and sends instructions to temporarily reserve the selected products 16 to the inventory-managing device 46.

In another embodiment (not shown) an alternative product-selection device comprises a plurality of intelligent product displays corresponding to specific products 16 housed in the dispensing machine 18. The displays could be located along aisles traditionally reserved for stocking products or anywhere else in the store. For example, an intelligent product display for a twelve-pack of replacement razor heads has a keypad for entering product selections and a scanner for identifying a customer by his key chain tag or customer card. The intelligent product display has a transmitter/receiver for receiving inventory data from the inventory-managing device 46 and sending transaction data (regarding selections made) along with the customer number to the inventory-managing device 46. At the check-out area 14, the customer could identify himself, and thus his order, by presenting the same key chain tag or customer card to a scanner on a product-selection device (such as product-selection device 42 illustrated in FIGS. 1-3) and modify the order as needed. The product-selection device then sends the applicable corresponding standardized product identification numbers to the POS 20 and sends instructions to temporarily reserve the selected products 16 (as modified) to the inventory-managing device 46.

Alternatively, an intelligent product display could write transaction data (regarding selections made) directly onto a customer-carried device such as a magnetic stripe card that can be swiped. For example, a customer could swipe his magnetic stripe card twice through a slot on the display for twelve-packs of replacement razor heads if he wanted to purchase two twelve-pack units of replacement razor heads. At the check-out area 14, the customer could input his order into a product-selection device by swiping his magnetic stripe card, which contains the transaction data, into a slot on a modified product-selection device (not shown) at the check-out area 14 and modify the order as needed. The product-selection device then sends the applicable corresponding standardized product identification numbers to the POS 20 and sends instructions to temporarily reserve the selected products 16 to the inventory-managing device 46.

If the intelligent product displays have receivers, the displays can receive inventory data form the inventory-managing device 46 and inform a customer accordingly about product 16 availability. If the displays do not have receivers, the customer will not know whether a product 16 is available for certain until he retrieves his order on the modified product-selection device at the check-out area 14.

In another embodiment (not shown), the store displays tokens such as pieces of paper that are descriptive of products 16 housed in the dispensing machine 18. The tokens include bar codes corresponding to the products they describe. The tokens could be located along aisles traditionally reserved for stocking products or anywhere else in the store. A customer collects tokens in desired quantities for the desired products 16 and brings them to the check-out area 14. At the check-out area 14, the customer or cashier scans the products into a modified product-selection device. The product-selection device retrieves from memory the standardized product identification numbers corresponding to the selected products 16, transmits the standardized product identification numbers to the POS 20, and sends instructions to temporarily reserve the products 16 to the inventory-managing device 46.

In other embodiments (not shown), a customer can select products for purchase 16 on a store website via the Internet prior to arriving at the store. In one such embodiment, the products 16 can be selected and reserved over the Internet via an Internet portal such as a personal computer for subsequent in-store purchase at the POS 20. The Internet facilitates the transmission of inventory data from the inventory-managing device 46 to the website, and the transmission of transaction data (including instructions to reserve units of a product 16) from the website to the inventory-managing device 46.

After making his selections, the customer then proceeds to the applicable store. Upon arriving at the check-out area 14, the customer identifies himself (or his order) with his customer number (or transaction number) by presenting a key chain tag, customer card, or printed out piece of paper to the scanner 70 on the product-selection device 42. The customer may then modify his order on the product-selection device 42 using the knobs 58-59 and buttons 66-69. The product-selection device then sends the applicable corresponding standardized product identification numbers to the POS 20 and sends instructions to temporarily reserve the selected products 16 (as modified) to the inventory-managing device 46. After purchase, the customer retrieves the products 16 from the dispensing machine 18 as described above.

In another embodiment, the products 16 are actually sold over the Internet and subsequently collected at the dispensing machine 18. The payment method may be made by debit, credit, or stored-value payment prior to arriving at the store. The customer, upon arriving at the store, may bypass the check-out area 14 and proceed directly to the dispensing machine to collect the purchased products 16. The customer can identify himself (or his order) to the scanner 104 on the dispensing machine 18 with his customer number (or transaction number) by presenting a bar code on a key chain tag, customer card, or printed out piece of paper.

Figure 8:
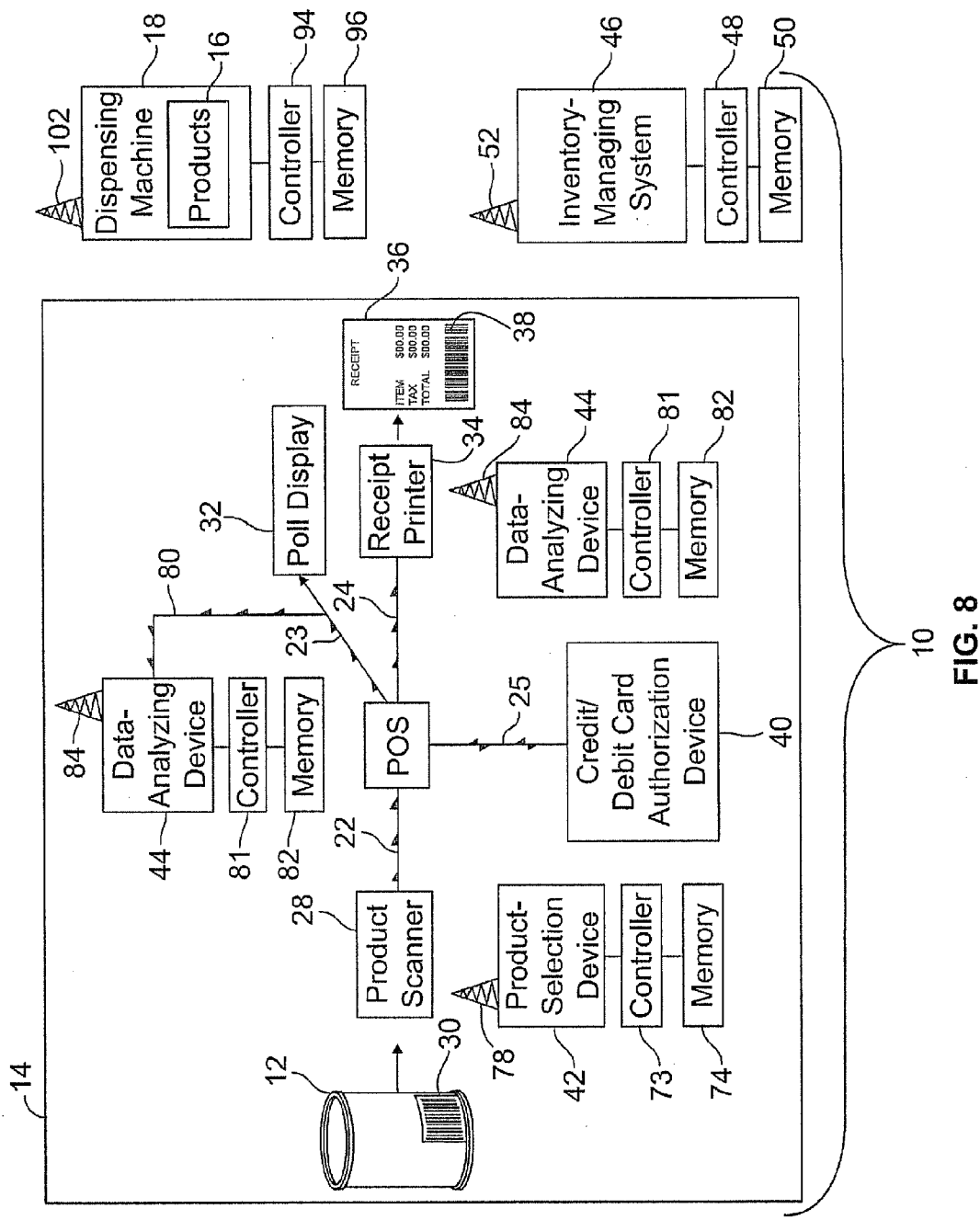
FIG. 8 illustrates a flowchart of a system for purchasing products according to an embodiment of the present invention.

While certain embodiments of the present invention employ the data-analyzing device 44 being configured to receive and understand data that is output from the POS 20 to the receipt printer 34, certain additional embodiments may employ the data-analyzing device 44 being configured to receive and understand data that is output from the POS 20 to the poll display 32. In such an embodiment, the data-analyzing device 44 is further able to understand modifications to the order received from the POS 20 and displayed on the poll display 32. The output data link 80 may run directly from the POS 20 as illustrated in FIG. 1, may feed off the data link 23 running from the POS 20 to the poll display 32 as illustrated in FIG. 8, or may intercept data from the POS 20 and relay that data to the poll display 32 (not shown). Further embodiments of the present invention may include the data-analyzing device 44 configured to receive and understand data output from the POS 20 that is intended to be received by either the poll display 32 or receipt printer 34.

While certain embodiments of the present invention employ a product-selection device 42 comprising the knobs 58-59 and buttons 66-69, other embodiments may employ a product-selection device comprising a touch-screen, keypad, or similar device.

Certain embodiments of the present invention may employ wired links where wireless links are described and wireless links where wired links are described.

While certain embodiments of the present invention employ the system 10 comprising the cashier-operated POS 20, other embodiments may employ a system comprising a customer-operated POS.

While certain embodiments of the present invention employ the system 10 wherein the data-analyzing device 44 sends a transaction number to the dispensing machine 18, other embodiments may employ a system wherein a data-analyzing device sends a customer identification number. For example, the customer could present a key chain tag, store member card, or any other item with a bar code encoding his customer identification number to the scanner 104 on the dispensing machine 18. The dispensing machine 18 would thereafter dispense the appropriate products 16.

While certain embodiments of the present invention employ product-selection devices and dispensing machines equipped with barcode scanners for identifying a customer and/or his transaction, alternative input devices may be used. Alternative devices include keypads, buttons, touch-screens and similar devices as well as devices for reading magnetic stripes, radio frequency identification ("RFID") tags, biometric data (e.g., finger prints), infrared signals, and optical signals. Identification cards such as smart cards, which can be carried by a customer and retain a customer's identification, may be configured to communicate with product-selection devices and dispensing machines by way of, for example, magnetic stripes or RFID tags. Likewise, personal portable devices such as small handheld computers, cellular telephones, portable music players, and the like, which can be carried by a customer and retain a customer's identification, may be configured to communicate with product-selection devices and dispensing machines by way of, for example, RFID tags, infrared signals, or optical signals.

Certain embodiments of the present invention might employ the transmission of certain non-product numbers in addition to the standardized product identification numbers corresponding to selected products. For example, a non-product number could be used to indicate that an age-restricted product such as alcohol or tobacco is being selected and that the customer's age must be verified. In such an embodiment, the customer's age may be verified at the POS 20 by an age-appropriate employee who must enter a validation code into the POS 20 such as a birth date or other input that authorizes the sale. The dispensing machine 18 may be configured to only dispense the age-restricted product if the validation code is entered at the POS 20. Where necessary or desirable, biometric data can be required at both the product-selection device 42 and at the dispensing machine 18, to ensure that the person purchasing the restricted product is the person collecting the restricted product at the dispensing machine 18.

Non-product numbers may also be used to control the sale and dispensing of prescribed medications and of products that are limited in quantity per customer. Thus, non-product numbers can be used to indicate restrictions on the purchase of products such as that a customer must be of a minimum age, must have a medical prescription, or may only purchase a limited quantity.

Certain embodiments of the present invention might employ the dispensing machine 18 inside the check-out area 14 (not shown). In a convenience store application, for example, the dispensing machine 18 may be located behind the counter such that dispensed products 16 are only accessible to employees and only as a result of a completed transaction. Alternatively, in another convenience store application, the dispensing machine 18 may be located adjacent to the POS 20 but accessible by customers. In that application, the dispensing machine 18 may further include a trough with a divider to segregate products 16 purchased by different customers, or alternatively, multiple troughs.

While certain embodiments of the present invention employ the dispensing machine 18 having infrared emitters 90 and 98 and sensors 92 and 100, other embodiments may include alternative emitters and sensors such as optical emitters and sensors.

While communication in certain embodiments of the present invention has been described as to or from the inventory-managing device 46, other embodiments may employ communication that bypasses the inventory-managing device 46. Additionally, the inventory-managing device 46 may be integrated into the dispensing machine 18, product-selection device 42, or data-analyzing device 44. Indeed, if there is only one POS 20 and/or only one dispensing machine 18 at a particular store, it may be preferable to integrate the inventory-managing device 46 into the dispensing machine 18, product-selection device 42, or data-analyzing device 44.

While certain embodiments of the present invention may describe the dispensing machine 18, the product-selection device 42, the data-analyzing device 44, and the inventory-managing device 46 as separate, other embodiments may comprise any two or more of the dispensing machine 18, the product-selection device 42, the data-analyzing device 44, and the inventory-managing device 46 integrated into a single apparatus.

While certain embodiments of the present invention may describe each of the dispensing machine 18, the product-selection device 42, the data-analyzing device 44, and the inventory-managing device 46 as having its own memory and/or controller, other embodiments may comprise two or more of the dispensing machine 18, the product-selection device 42, the data-analyzing device 44, and the inventory-managing device 46 as sharing a memory and/or controller.

While the use of the Internet has been employed in certain embodiments of the present invention, any telecommunication device such as a telephone or facsimile is contemplated.

While certain embodiments of the present the invention have been described for use in grocery store and convenience store applications, the present invention is not limited to those applications. Rather, the invention is intended to be used in any retail or merchandising application.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of dispensing a purchased product to a customer, comprising:
   receiving data from a point-of-sale device, said received data corresponding to a completed sale transaction;
   identifying, from said received data, a purchased product that is housed in a dispensing machine; and
   transmitting to said dispensing machine instructions for dispensing said purchased product to a customer, wherein said instructions for dispensing said purchased product include data corresponding to the age of said customer and wherein said method further comprises verifying the age of said customer at the dispensing machine.

2. A method of dispensing a purchased product to a customer, comprising:
   receiving data from a point-of-sale device, said received data corresponding to a completed sale transaction;
   identifying, from said received data, a purchased product that is housed in a dispensing machine; and transmitting to said dispensing machine instructions for dispensing said purchased product to a customer, wherein said identifying step further comprises identifying, from said received data, a restriction on a purchased product that is housed in a dispensing machine.

3. A system for purchasing products comprising:
   a point-of-sale device equipped with a product-scanner for scanning a first product that is physically present at a point-of-sale;
   a dispensing machine for dispensing a second product that is not physically accessible at said point-of-sale;
   a product-selection device having
      selection apparatus for selecting said second product by a characteristic other than by a standardized product identification number corresponding to said second product,
      memory apparatus for retrieving said standardized product identification number corresponding to said second product, and
      communication apparatus for sending said standardized product identification number to said point-of-sale device; and
   a data-analyzing device for identifying said second product from said completed sale transaction data received from said point-of-sale device, and for transmitting to said dispensing machine instructions for dispensing said second product.

4. The system of claim 3 wherein said product-selection device comprises a first unit located distal from said point-of-sale device and a second unit located proximate to said point-of-sale device, said first unit comprising said selection apparatus, and said second unit comprising said memory apparatus and said communication apparatus.

5. The system of claim 3 wherein said product-selection device comprises a first unit located distal from said point-of-sale device and a second unit located proximate to said point-of-sale device, said first unit comprising said selection apparatus and said memory apparatus, and said second unit comprising said communication apparatus.

6. The system of claim 3, wherein said point-of-sale device executes the sale of both said first and second products.

* * * * *

UNITED STATES PATENT AND TRADEMARK OFFICE
CERTIFICATE OF CORRECTION

PATENT NO. : 7,581,676 B2 Page 1 of 1
APPLICATION NO. : 11/329608
DATED : September 1, 2009
INVENTOR(S) : Skor et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 601 days.

Signed and Sealed this

Fourteenth Day of September, 2010

David J. Kappos
*Director of the United States Patent and Trademark Office*